US012691540B2

(12) United States Patent
Maurer

(10) Patent No.: US 12,691,540 B2
(45) Date of Patent: Jul. 28, 2026

(54) MACHINE TOOL AND METHOD FOR CONTROLLING A MACHINE TOOL

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 516 days.

(21) Appl. No.: 18/213,946

(22) Filed: Jun. 26, 2023

(65) Prior Publication Data

US 2024/0009787 A1    Jan. 11, 2024

(30) Foreign Application Priority Data

Jul. 5, 2022    (EP) ..................................... 22183143

(51) Int. Cl.
G05B 19/414        (2006.01)
B23Q 3/06          (2006.01)
B23Q 5/54          (2006.01)
G05B 9/03          (2006.01)

(52) U.S. Cl.
CPC ................. B23Q 5/54 (2013.01); B23Q 3/06 (2013.01); G05B 9/03 (2013.01); G05B 19/414 (2013.01); B23Q 2703/02 (2013.01)

(58) Field of Classification Search
CPC ........ B23Q 5/54; B23Q 3/06; B23Q 2703/02; G05B 9/03; G05B 19/414
See application file for complete search history.

(56) References Cited

U.S. PATENT DOCUMENTS

| | | | |
|---|---|---|---|
| 2006/0176823 A1 | 8/2006 | Barajas | |
| 2020/0078872 A1* | 3/2020 | Maurer | ............. B23B 31/16283 |
| 2022/0011183 A1* | 1/2022 | Stangl | ...................... H04Q 9/00 |
| 2022/0193850 A1* | 6/2022 | Hediger | ............... B23Q 1/0072 |
| 2024/0181582 A1* | 6/2024 | Köchl | .................. B23Q 1/0027 |

FOREIGN PATENT DOCUMENTS

| | | |
|---|---|---|
| EP | 3620248 | 3/2020 |
| EP | 4015144 | 6/2022 |

* cited by examiner

*Primary Examiner* — Michael W Choi
(74) *Attorney, Agent, or Firm* — Collard & Roe, P.C.

(57)        ABSTRACT

It is already know from the prior art to provide machine tools with a clamping device, in which a portion of the control is transferred to the clamping device. This simplifies the connection to the available machine control and allows a simplified coupling of the clamping device to the machine tool. However, in spite of the inductive coupling between the machine control and the clamping device control, it is not ensured that process data sets reach their intended destination.

This situation is addressed by the present invention in that a clamping device control is allocated to the clamping device, two redundant microprocessors are included, which analyze received process data sets independently of each other and, in the case of an error, transfer the clamping device into a safe state.

12 Claims, 2 Drawing Sheets

MACHINE TOOL AND METHOD FOR CONTROLLING A MACHINE TOOL

REFERENCE TO PENDING PRIOR PATENT APPLICATION

This patent application claims benefit of European Patent Application No. 22 183 143.1, filed Jul. 5, 2022, which patent application is hereby incorporated herein by reference.

FIELD OF THE INVENTION

The present invention relates to a machine tool with a stationary machine control and a rotating clamping device, wherein the machine control communicates with a clamping device control that is rotating with the clamping device with the intermediate connection of a coupling unit, wherein the coupling unit provides a contactless data connection from the machine control to the clamping device control, wherein the clamping device control comprises a control unit for actuating advancement means for activating clamping means of the clamping device and at least two redundant microprocessors are allocated to the control unit, via which process data sets received by the machine control via the control unit can be verified independently of each other and/or process data received by process sensors can be used independently of each other in process data sets and can be transmitted via the control unit to the machine control, as well as a method for controlling such a machine tool.

BACKGROUND OF THE INVENTION

A machine tool of this type is already previously known from EP 4 015 144 A1. With respect to the further prior art, reference is made first of all to EP 3 620 248 A1. This document provides a coupling device for a machine tool, via which an inductively operated clamping chuck achieves, independently of user-specifically available components of the machine tool, an electric coupling in the simplest possible manner, and a monitoring of the function of the clamping chuck and of the clamping jaws attached thereto is guaranteed.

This is accomplished by the arrangement of a programmable interface in such a way that an interface is allocated to the clamping chuck, which interface can be actuated by a control unit of a machine control with the intermediate connection of a coupler.

However, the problem with this is that it is not possible to ensure that adjustment signals, above all that safety-critical signals such as a safe torque off signal (STO signal), for instance, are transferred correctly via the inductive coupler and received appropriately.

This stop function is the most common safety function, on the basis of which a drive is no longer supplied with energy that causes rotation or movement. The drive phases out torque-free until standstill. Even an unintentional restart is prevented by this stop function.

To be sure the prior art provides for a redundant check, but since the transmission path via the inductive coupler is the same for both redundantly maintained controls, there is the increased risk in the event of the loss of a data packet at a first control that the corresponding data packet will also be lost at the redundant second control.

Moreover, reference is made to US 2006/176823 A1 as additional prior art.

Against this background, the present invention addresses the problem of creating a machine tool in which a coupling between the machine control and clamping device is designed in such a way that the reliability of data communication is improved with respect to the prior art.

This is achieved by a machine tool according to the features of independent claim 1, as well as method for controlling such a machine tool according to the features of subordinate claim 6. Meaningful embodiments of such a machine tool and a corresponding method for control thereof can be found in the respectively subsequent dependent claims.

According to the invention, a machine tool with a stationary machine control and a rotating clamping device is provided, wherein the machine control communicates with a clamping device control that is rotating with the clamping device with the intermediate connection of a coupling. It is characterized in that the coupling unit provides a contactless data connection from the machine control to the clamping device control, wherein the clamping device control comprises a control unit for actuating advancement means for activating clamping means of the clamping device and at least two redundant microprocessors are allocated to the control unit, via which process data sets received by the machine control via the control unit can be verified independently of each other and/or process data received by process sensors can be used independently of each other in process data sets and can be transmitted via the control unit to the machine control.

Thus, a machine control is formed on the side of the machine tool and a clamping device control is formed on the side of the clamping device, which communicate with each other via the interconnected coupling unit. The advancement means can be controlled by controllers, which facilitate an advancement of the clamping means towards each other. Based on this advancement with opposing clamping means, said clamping means enclose a workpiece from opposite sides in the case of an even number of clamping means. In the case of a clamping device with three clamping means, there are no opposite sides, but an offset of 120° is selected, and 72° in the case of five clamping means and so forth. A workpiece is thereby centered between the clamping means.

In order to establish an improved data security, process data sets which are received by a control unit of the clamping device control and thus constitute output signals of the machine control are analyzed by two identical microprocessors, which are maintained redundantly to each other. The process data sets to be received contain among other things a STO signal, all process data sets, on the other hand, contain a calculated signature and a sequential identification number. If the microprocessors determine that the value of the STO signal requires a safe operating mode, they will transmit this to the respectively allocated controller of the clamping means and thereby ensure that an opening of the clamping means, in other words, an operation of the advancement means or the adjusting motor is not possible until the STO signal cancels the safe mode again. Concretely, a value of the STO signal of 1 can require a safe operating state, and a STO signal of 0 cancels a safe operating state. This allows a simple coding in an altogether short message, which can be transmitted with the simplest infrastructure.

If an invalid signature is received which contains an erroneous CRC code, Huffman code, an incorrect check digit or the like, this indicates a malfunction and the communication is no longer reliable. Therefore, the microprocessor will pass this on to the control unit of the clamping device control and it will reliably stop the machine. If what is received does not match the anticipated sequential identification number, then the same thing occurs, since communication is possibly running in a circle or disrupted as a whole.

Because of the redundancy of microprocessors, the reliability with which an error can be detected and recognized as such is increased. It is possible to use even more than two microprocessors, however, an operation is always possible with two microprocessors.

Even if process data sets are compiled and sent as input signals for the machine control, the redundancy of the microprocessors is an advantage. Every safety-critical sensor, in particular force sensors or clamping signal transmitters, which display the clamping status such as a zero point clamping system, communicate with respectively one microprocessor, wherein a microprocessor conversely is able to communicate with several different sensors.

Within the framework of communication, the different microprocessor signals can be handled here in such a way that either each microprocessor transmits its own signals to the control unit and said control unit prepares a signal to the machine control, or else a circulating process data set is prepared and the microprocessors insert the signals that they have processed into said data set and supplement the process data sets in this manner.

With some advantage, the advancement means of the clamping means can be servomotors, which are controlled with the aid of servocontrollers. The servomotors move the clamping means towards the clamping device in the direction of a workpiece to be centered until said workpiece is held with a predetermined force and then end their advancement. It is then ensured with the aid of a friction brake that the position that was just adopted will not be abandoned again until there is an opening signal. A mechanical self-locking effect also takes place via the gear.

In a first embodiment, respectively at least one force sensor or clamping signal transmitter can furthermore be allocated to the clamping means so that they are respectively data-connected solely with one of the microprocessors. In this case, several microprocessors are used, i.e., just as many as the clamping means. Since the use and coordination of numerous microprocessors are costly and involved, this embodiment is not preferred.

An embodiment is preferred in which respectively at least one force sensor or clamping signal transmitter is allocated to the clamping means and the force sensors or clamping signal transmitters of several clamping means are allocated to the microprocessors, wherein the force sensors or clamping signal transmitters of clamping means are allocated to different microprocessors with oppositely acting force components. In this case, a linking results in such a way that the clamping means that oppose each other in pairs are respectively monitored by different microprocessors, so that monitoring of each pair takes place by two microprocessors. This means that two microprocessors are always needed in this embodiment irrespective of how many clamping means are ultimately used.

In a further embodiment, respectively at least one force sensor or clamping signal transmitter can be allocated to the clamping means and at the same time the force sensors or clamping signal transmitters of several clamping means can be allocated to the microprocessors, wherein the force sensors or clamping signal transmitters of clamping means are allocated to different microprocessors with oppositely acting force components. Therefore, if three clamping jaws are concretely provided in a clamping chuck for example, then two of them can be monitored by one microprocessor, and the third by the other microprocessor.

Furthermore, it can be provided that path sensors are allocated to the clamping means, which sensors are data-connected to control unit. In this case, it is not a matter of safety-relevant measured values since a critical state cannot be ascertained from the mere position of the clamping means. Said measured values are thus not transmitted to the microprocessors, but transferred instead solely to the control unit of the clamping device control.

In a concrete embodiment, an inductively coupled data connection can be established between the machine control and the clamping device control via the coupling device. An inductive coupling is advantageous because it makes both an energy coupling as well as a signal coupling possible. However, it is still possible according to the invention to provide a hydraulic coupling for instance, whereas the signal coupling can take place inductively. A contactless coupling is required in general based on the fact that a signal and energy transfer must be created from the stationary machine tool to the rotating clamping device.

With some advantage, it is provided that the clamping device control communicates with the machine control on the basis of the Ethernet protocol. This is a rapid and robust protocol, which is also able to communicate wirelessly. A PROFINET connection can be used in this case for example, whereas bus systems such as a CAN bus can also be used within the clamping device control and/or the machine control.

BRIEF DESCRIPTION OF THE DRAWINGS

The invention described in the foregoing will be explained in greater detail in the following on basis of an exemplary embodiment, which shows.

DETAILED DESCRIPTION OF THE PREFERRED EMBODIMENTS

Figure 1:
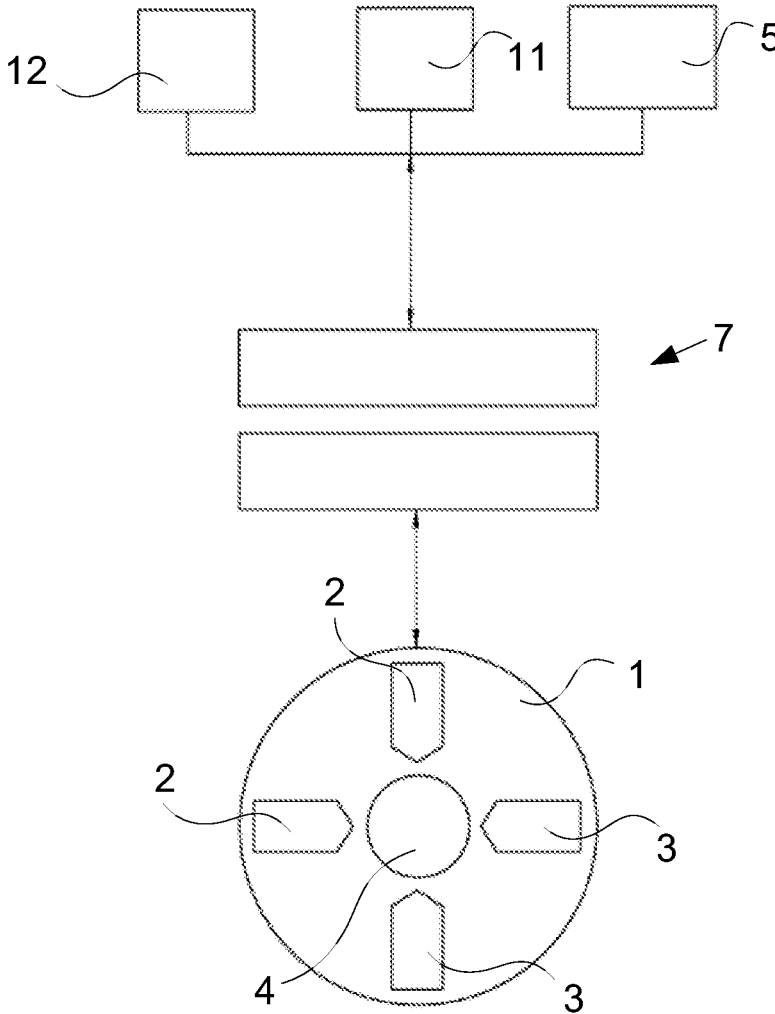
FIG. 1 A schematic representation of a machine tool with a clamping device and a machine control, which is connected via a coupler to a clamping device control allocated to the clamping device, as well as FIG. 2 A more detailed schematic representation of the machine tool with the details of the clamping device control and the machine control.

In a schematic representation, FIG. 1 shows a clamping device 1, which comprises two pairs of clamping means 2, 3, by means of which a workpiece 4 is held all around offset by 90° in each case. Via an inductive coupler 7, a clamping device control 20 of the clamping device 1 communicates with a machine control 10 of the machine tool, for which a control unit 11, a safety control unit 12, and a power supply 5 are shown in detail in this case. Control units 11 and 12, as well as a control unit 21 of the clamping device control 20, can be designed in particular as a programmable logic controller (PLC).

Whereas on the part of the control unit 11, adjustment signals, for example based on a running program or based on user settings on an interface that is not shown here, are output to the clamping device control 20, the safety control unit 12 is available mainly or exclusively for the communication of safety-relevant signals. A part of this is in particular the transmission of a force signal that indicates the force which with the clamping means 2, 3 grip a workpiece. To improve the reliability of the data transmission via the inductive coupler 7, the invention provides that a redundant monitoring of the signals, which are transmitted to the control unit 21 of the clamping device control 20, takes place with the aid of redundantly designed microprocessors 22, 23 in the clamping device control 20. A transfer via the inductive coupler 7 constitutes a normal, simple communication channel and is not secure to begin with. The analysis of the signals that pass through the inductive coupler 7 by two independent microprocessors 22, 23 therefore helps to improve the reliability of the data transmission.

Figure 2:
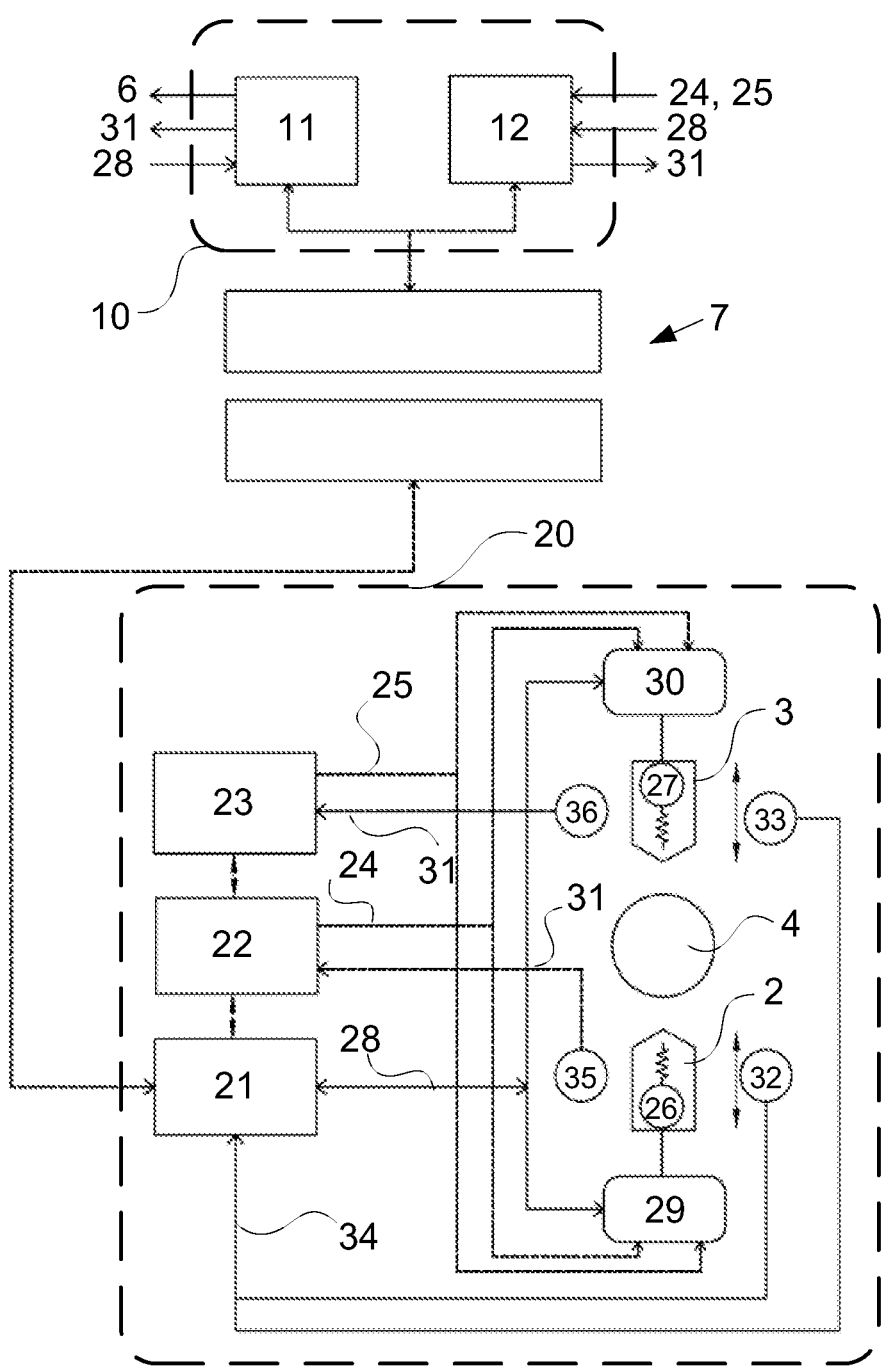

As a supplement to the simple representation in FIG. 1, this situation is reflected with a greater degree of detail in FIG. 2, wherein individual subordinate aspects have been dispensed with.

Using the example of two clamping means 2, 3, it is evident that a workpiece 4 can be centered by said clamping means. To this end, the clamping means 2, 3 can be moved with the aid of servomotors 26, 27, which are monitored with the aid of path sensors 32, 33. The control takes place with the aid of a control unit 21 of the clamping device control 20 using a CAN bus. This provides a data connection of the servocontrollers 29, 30 to the control unit 21. While the control instructions come from the machine control 10, and in this case in detail from a control unit 11, the direct actuation of the servocontrollers 29, 30 and, via this, the actuation of the servomotors 26, 27 run within the clamping device control 20. As already depicted FIG. 1, the clamping device control 20 and machine control 10 are data-connected via an inductive coupler 7.

Concretely, adjustment commands based on corresponding programming are transferred first of all to a control unit 11 of machine control 10. Said control unit for its part sends adjustment commands via the inductive coupler 7 to the control unit 21 of the clamping device control 20. The control unit 21 thereupon causes the clamping means 2, 3 to close for example, in other words, to move towards the workpiece 4. Corresponding control signals 28 are transmitted to the two servocontrollers 29, 30, which for their part correspondingly actuate the servomotors 26, 27 in turn. The path sensors 32, 33 monitor the situation of the respectively allocated clamping means 2, 3 and report their positions back to the control unit 21.

At the same time, however, the force acting on the clamping means 2, 3 is recorded. For this purpose, a force sensor 35, 36 is allocated to each clamping means 2, 3, which force sensor communicates with a microprocessor 22, 23 and transmits status signals 31 to it. In order to achieve an adequate level of redundancy in data collection, a first force sensor 35 allocated to a first clamping means 2 communicates with a first microprocessor 22, while an additional force sensor 36 that is allocated to an additional clamping means 3 communicates with a second microprocessor 23. The microprocessors 22, 23 receive the force signals and enter them into a process data set, which is filled by the microprocessors 22, 23 in a circulating procedure and then transmitted by the control unit 21 to the machine control 10. There in particular the safety control unit 12 receives and processes the signals from the force sensors. If an error occurs in the process, i.e., in particular a force that is decreasing, the machine control 10 is able to react to this and regulate the machine into a safe state. Two criteria must always be satisfied, that the clamping means may not loosen and the workpiece remains clamped with the target clamping force.

For an adequate level of redundancy, it suffices if several microprocessors 22, 23 are involved in control in the case of every force equilibrium so that, even if there is a greater number of clamping means 2, 3, more than two microprocessors 22, 23 do not necessarily need to be involved. However, this can be implemented in this way nevertheless. Even in the case of an uneven number of clamping means, it is possible for instance to control one clamping means from one microprocessor, and the other two clamping means from the other microprocessor, since at least two microprocessors are involved in controlling the force total at every clamping means.

During operation, if a microprocessor 22, 23 detects an incorrect force, in particular too high a force, at a force sensor 35, 36, or if other critical malfunctions occur, namely an error in a signature or an identification number of a process data set, which are redundantly checked by the microprocessors 22, 23, then the microprocessor 22, 23 report this to the safety control unit 12 of the machine control 10, which regulates the machine into a safe state, in particular using a stop signal, which stops the machine in order to prevent injury or damage based on the rapidly rotating workpiece, which in the most unfavorable case is now loosened.

Therefore, the foregoing describes a machine tool in which a coupling between the machine and tool is designed in such a way that the reliability of data communication is improved with respect to the prior art.

LIST OF REFERENCE NUMBERS

1 Clamping device
2 First clamping means
3 Additional clamping means
4 Workpiece
5 Power supply
6 Monitoring signal
7 Inductive coupler
10 Machine control
11 Control unit
12 Safety control unit
20 Clamping device control
21 Control unit
22 First microprocessor
23 Second microprocessor
24 First stop signal
25 Second stop signal
26 First servomotor
27 Additional servomotor
28 Control signal
29 First servocontroller
30 Additional servocontroller
31 Status signal
32 First path sensor
33 Additional path sensor
34 Displacement signal
35 First force sensor
36 Additional force sensor

What is claimed is:

1. A machine tool with a stationary machine control (10) and a rotating clamping device (1), wherein the machine control (10) communicates with a clamping device control (20) that is rotating with the rotating clamping device (1) with the intermediate connection of a coupling unit (7), wherein the coupling unit (7) provides a contactless data connection from the machine control (10) to the clamping device control (20), wherein the clamping device control (20) comprises a control unit (21) for actuating advancement means for activating clamping means (2, 3) of the rotating clamping device (1) and at least two redundant microprocessors (22, 23) allocated to the control unit (21), via which process data sets received by the machine control (10) via the control unit (21) can be verified independently of each other and/or process data received by process sensors can be used independently of each other in process data sets and can be transmitted via the control unit (21) to the machine control (10), characterized in that respectively at least one force sensor (35, 36) or clamping signal transmitter is allocated to the clamping means (2, 3) and the at least one force sensor (35, 36) or clamping signal transmitter is respectively data-connected solely with one of the at least two redundant microprocessors (22, 23), or the at least one force sensors (35, 36) or clamping signal transmitters of the clamping means (2, 3) are allocated to the at least two redundant microprocessors (22, 23), and the at least one force sensors (35, 36) or clamping signal transmitters of opposing clamping means of the clamping means (2, 3) are allocated to different microprocessors of the at least two redundant microprocessors (22, 23).

2. The machine tool according to claim 1, characterized in that the advancement means of the clamping means (2, 3) are servomotors (26, 27), which are controlled with the aid of servocontrollers (29, 30).

3. The machine tool according to claim 1, characterized in that respectively at least one force sensor (35, 36) or clamping signal transmitter is allocated to the clamping means (2, 3) and the at least one force sensors (35, 36) or clamping signal transmitters of the clamping means (2, 3) are allocated to the at least two redundant microprocessors (22, 23), wherein the at least one force sensors (35, 36) or clamping signal transmitters of the clamping means (2, 3) are allocated to different microprocessors of the at least two redundant microprocessors (22, 23) with oppositely acting force components.

4. The machine tool according to claim 1, characterized in that path sensors (32, 33) are allocated to the clamping means (2, 3), wherein the path sensors are data-connected to the control unit (21).

5. The machine tool according to claim 1, characterized in that an inductively coupled data connection is established between the machine control (10) and the clamping device control (20) via the coupling unit (7).

6. A method for controlling a machine tool with a stationary machine control (10) and a rotating clamping device (1), wherein the machine control (10) communicates with a clamping device control (20) that is rotating with the rotating clamping device (1) with the intermediate connection of a coupling unit (7), wherein the coupling unit (7) provides a contactless data connection from the machine control (10) to the clamping device control (20), and the clamping device control (20) comprises a control unit (21) for actuating advancement means for activating clamping means (2, 3) of the rotating clamping device (1), and process data sets sent by the machine control (10) to the clamping device control (20) are independently checked by two redundant microprocessors (22, 23) and/or the two redundant microprocessors (22, 23) use process data received from process sensors independently of each other to generate process data sets and transmit the process data sets to the machine control (10) via the control unit (21), characterized in that that respectively at least one force sensor (35, 36) or clamping signal transmitter is allocated to the clamping means (2, 3), and process data sets sent therefrom are respectively checked solely by one of the two redundant microprocessors (22, 23), or the at least one force sensors (35, 36) or clamping signal transmitters of the clamping means (2, 3) are allocated to the two redundant microprocessors (22, 23) and the at least one force sensors (35, 36) or clamping signal transmitters of opposing clamping means of the clamping means (2, 3) are allocated to different microprocessors of the two redundant microprocessors (22, 23) for checking the process data sets that are sent.

7. The method according to claim 6, characterized in that process data sets comprise a calculated signature and/or a sequential identification number.

8. The method according to claim 7, characterized in that, in the event of the receipt of a STO signal or in the case of an error in a signature or a deviation from an anticipated identification number, the two redundant microprocessors (22, 23) output independently of one another a stop signal to the clamping means (2, 3).

9. The method according to claim 6, characterized in that process data sets output by the machine control (10) for each of the advancement means includes a STO signal (safe torque off signal), wherein a movement of the relevant advancement means is released only if the signal corresponds to a release signal.

10. The method according to claim 6, characterized in that sensor data from the at least one force sensors (35, 36) or clamping signal transmitters is transmitted to the two redundant microprocessors (22, 23) and said sensor data is used in process data sets for dispatch to the machine control (10).

11. The method according to claim 10, characterized in that each of the two redundant microprocessors (22, 23) prepares its own process data sets and transmits via the control unit (21) to the machine control (10).

12. The method according to claim 10, characterized in that each of the two redundant microprocessors (22, 23) enters the process data that it receives in a circulating process data set and the control unit (21) transmits the circulating process data set to the machine control (10).

* * * * *